No. 810,447. PATENTED JAN. 23, 1906.
R. A. B. WALSH.
MACHINE FOR MAKING WIRED PLATE GLASS.
APPLICATION FILED JULY 22, 1905.
2 SHEETS—SHEET 1.
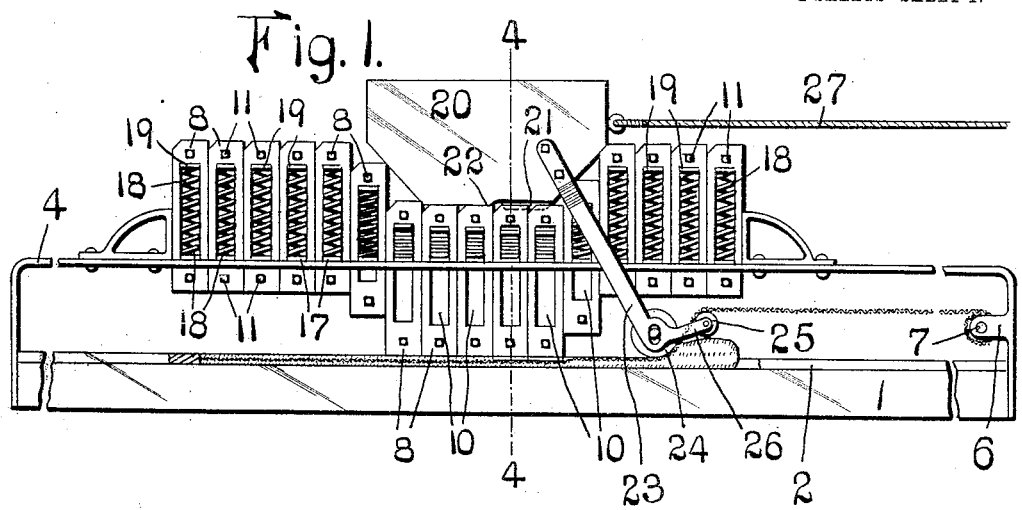
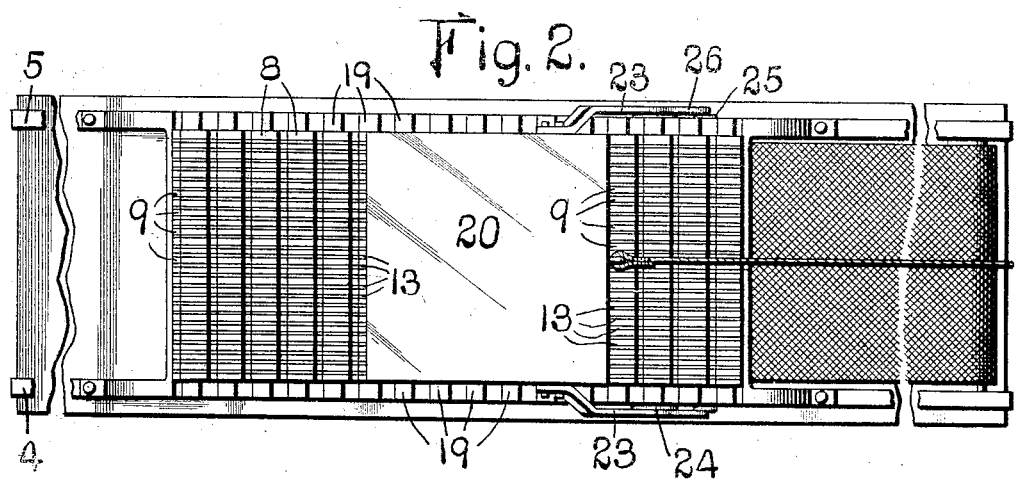
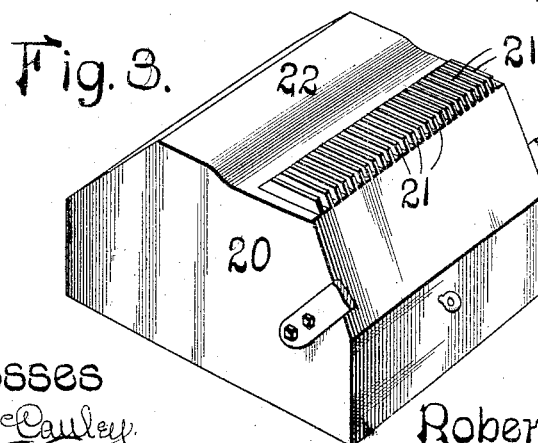
Witnesses
a. J. McCauley
B. F. Funk
Inventor:
Robert A. B. Walsh
BY Bakewell & Cornwall
ATTY'S.

No. 810,447. PATENTED JAN. 23, 1906.
R. A. B. WALSH.
MACHINE FOR MAKING WIRED PLATE GLASS.
APPLICATION FILED JULY 22, 1905.
2 SHEETS—SHEET 2.
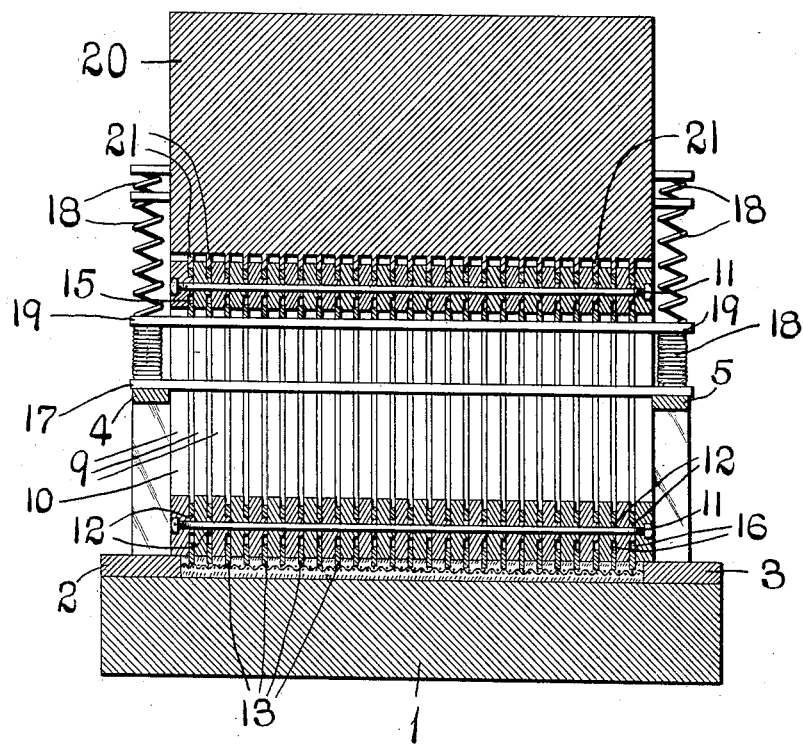
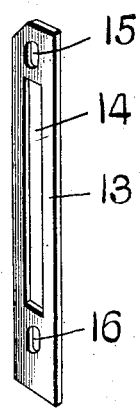
Witnesses
A. J. McCauley
B. F. Funk
Inventor:
Robert A. B. Walsh
BY Bakewell & Cornwall
ATTY'S.

UNITED STATES PATENT OFFICE.

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

MACHINE FOR MAKING WIRED PLATE-GLASS.

No. 810,447.　　　　Specification of Letters Patent.　　　　Patented Jan. 23, 1906.

Application filed July 22, 1905. Serial No. 270,773.

*To all whom it may concern:*

Be it known that I, ROBERT A. B. WALSH, a citizen of the United States, residing at St. Louis, Missouri, have invented a certain new and useful Improvement in Machines for Making Wired Plate-Glass, of which the following is a full, clear, and exact description, such as will enable others skilled in the art to which it appertains to make and use the same, reference being had to the accompanying drawings, forming part of this specification, in which—

Figure 1 is a side elevational view of a machine for manufacturing wired plate-glass and constructed in accordance with my invention. Fig. 2 is a top plan view of the same. Fig. 3 is an inverted perspective view of an actuating element for moving the wire-positioning devices. Fig. 4 is a sectional view on the line 4 4 of Fig. 1. Fig. 5 is a detail perspective view of one of the wire-positioning devices or punchers, and Fig. 6 is a detail perspective view of one of the coverers.

This invention relates to a machine for making wired glass; and one of the objects is to provide means for properly embedding wire in a plate or sheet of glass so that the wire will be positioned in its proper place and any liability of the wire mesh protruding through either surface will be avoided.

Another object of the invention is to provide a sheet of wired glass of uniform thickness.

Other objects and advantages, as well as the novel details of construction of this invention, will be specifically described hereinafter, it being understood that changes in form, proportion, and minor details of construction may be resorted to without departing from the spirit or sacrificing any of the advantages thereof.

In the drawings illustrating the preferred embodiment of my invention, 1 designates a table or bed provided with the usual trangs 2 and 3. Supporting-frames 4 and 5 are secured to this bed or table, and journaled in projections 6 in the standards at one end of the bed is a reel 7, adapted to carry the wire mesh to form part of the finished sheet. Supported upon the frames 4 and 5 are a plurality of depressible and resiliently-supported elements 8. These elements are preferably composed of a plurality of bars 9, having elongated slots 10 therein, which run longitudinally of the bars but transversely through them. A number of these bars 9 are caused to aline and are held together by means of transversely-arranged rods 11, which pass through them and through spacers 12. These spacers may consist of bosses or washers, as the circumstances may warrant. As the bars are secured together, they practically form a single element extending entirely across the bed of the machine. In the spaces between the bars 9 are wire-positioning elements, which might properly be termed "punchers," in that they punch or force the mesh into the plate of glass as it is formed on the bed. These punchers are illustrated in Fig. 5 as consisting of bars 13, having elongated slots 14, coinciding with the slots 10 in the bars 9, and are also provided with elongated bolt-openings 15 and 16, through which the bolts 11 project, so that while the punchers 13 are securely held against displacement they are permitted to have a longitudinal movement, as will presently be described. Transversely-arranged bars 17 rest upon the upper portions of the frames 4 and 5 and constitute spring-seats against which the lower ends of the springs 18 rest, while the upper ends of said springs abut against similarly-arranged transverse bars 19, so that the normal tendency will be to elevate the devices 8 above the bed 1.

A sliding actuating element 20, comprising an actuated block, is positioned upon the elements 8, said block having chamfered ends at the front and rear portions thereof, the bottom element being provided with teeth or projections 21, which are spaced apart the width of the bars 9, so that the teeth or projections 21 may be interposed between them and act upon the punchers 13. Beyond the projections 21 the block 20 is offsetted, as at 22, as will be explained hereinafter. Movable in depending arms 23, carried by the block 20, is a spreading-roller 24, which is immediately in rear of a wire-mesh-guiding roller 25, carried by the bracket-arms 26 on the arm 23.

All of the parts being assembled, it will be assumed that the actuating element 20 is at the front end of the machine—that is, at the left-hand end as indicated in the drawings. A batch of glass may be placed upon the bed 1. By actuating the element 20—as, for example, by pulling on the cable 27 or by actuating it by any other means—the glass will be spread upon the table or base, and at the same time the wire mesh will be fed onto the glass, which is in a semimolten state. During the operation of spreading the glass upon the base the teeth or projections 21 will slide between the bars 9, so as to depress the punchers 13 and force the wire mesh in proper position between the upper and lower surface of the sheet of glass. As the teeth pass beyond the punchers they will be caused to rise on account of the resilient cushion of the springs against the bars 19 until the bottom edges of said punchers aline with the bottom edges of the bars 9, when the portion 22 of the actuating device 20 will depress the entire element 8 to obliterate any inequalities in the glass due to the fact that the punchers disturb the glass in positioning the wire. As a result of this second depression the glass sheet will be left smooth, and after the elements 8 have been successively operated upon by the element 20 the entire wired-glass sheet will be formed. After the glass sheet is formed it may be withdrawn from the base and placed upon a suitable truck to be conveyed to the annealing-ovens, as is common in the manufacture of plate-glass.

From the foregoing it will be apparent that the position of the wire mesh with respect to the upper and lower surface of the plate will be uniform, and in view of the fact that the trangs 2 and 3 will be of a predetermined thickness and of a uniform thickness throughout the entire glass sheet will be of a uniform thickness throughout. Attention is directed to the fact that all of the punchers carried by each element 8 are between the inner edges of the trangs 2 and 3; but the outer members 9 of the elements 8 are beyond the inner edges, so that while the punchers will be permitted to initially enter the glass below the upper surface of the trangs, so as to position the wire, they will not be permitted to do so during the second operation, because as the teeth or projections 21 will not be acting upon them they may only descend as far as the bars 9. Hence the second depression will be even and uniform, so as to obliterate any inequalities in the upper surface of the glass, as has been heretofore explained.

While I have illustrated my invention as being adapted for the manufacture of plain wired glass, I would have it understood that the machine may be easily adapted for the manufacture of cathedral, prismatic, or configured glass by providing a suitable bed and without otherwise modifying the machine.

Having thus described my invention, what I claim as new, and desire to secure by Letters Patent, is—

1. In a machine for making wired glass, the combination with a base, of reciprocatory wire-positioning elements carried by said base and arranged in transverse series above the same, of plate-forming elements reciprocatingly mounted between alternate wire-positioning elements, said plate-forming elements being capable of actuation only after the wire-positioning elements have been actuated, and means for actuating both sets of elements; substantially as described.

2. In a machine for making wired glass, the combination with a base, of reciprocatory wire-positioning elements above the base, a reciprocatory means for finishing the sheet of glass by pressing the upper surface thereof, and a weight movable over said wire-positioning elements and said finishing means to actuate first the wire-positioning elements and then the finishing means; substantially as described.

3. In a machine for making wired glass, the combination with a bed or base, of a roller for forming a sheet or plate on the base, vertically-reciprocatory wire-positioning elements for forcing the wire in position with respect to the glass, reciprocatory elements for engaging the glass to smooth out any inequalities formed by the wire-positioning elements, and a weight movable over the reciprocatory wire-positioning elements and the elements for engaging the glass to smooth out any inequalities, the last-named elements being actuated after the actuation of the reciprocatory wire-positioning elements; substantially as described.

4. In a machine for making wired glass, the combination with a base, of means for forming a sheet of glass on said base, means for feeding a wire mesh on the upper surface of the glass, punchers for embedding the wire mesh below the upper surface of the glass, reciprocatory smoothing elements between which said punchers are positioned, and means for actuating the punchers and the smoothing elements; substantially as described.

5. In a machine for forming wired plate-glass, the combination with a base, of means for spreading the glass upon the base, wire-impressing punchers above the base, vertically-movable smoothing elements between which said punchers are positioned, and a sliding element 20 for actuating the punchers and the smoothing elements; substantially as described.

In testimony whereof I hereunto affix my signature, in the presence of two witnesses, this 12th day of July, 1905.

ROBERT A. B. WALSH.

Witnesses:
 B. F. FUNK,
 GEORGE BAKEWELL.